(12) United States Patent
Gillum

(10) Patent No.: US 8,607,361 B2
(45) Date of Patent: Dec. 10, 2013

(54) EMAIL TRUST SERVICE

(75) Inventor: Eliot C. Gillum, Mountain View, CA (US)

(73) Assignee: Microsoft Corporation, Redmond, WA (US)

( * ) Notice: Subject to any disclaimer, the term of this patent is extended or adjusted under 35 U.S.C. 154(b) by 254 days.

(21) Appl. No.: 12/978,227

(22) Filed: Dec. 23, 2010

(65) Prior Publication Data

US 2012/0167233 A1 Jun. 28, 2012

(51) Int. Cl.
*H04L 29/06* (2006.01)

(52) U.S. Cl.
USPC ............................................ 726/29; 709/206

(58) Field of Classification Search
USPC .......................................................... 726/29
See application file for complete search history.

(56) References Cited

U.S. PATENT DOCUMENTS

| | | | |
|---|---|---|---|
| 5,999,932 A | 12/1999 | Paul | |
| 6,023,723 A | 2/2000 | McCormick et al. | |
| 6,321,267 B1 | 11/2001 | Donaldson | |
| 6,779,021 B1 | 8/2004 | Bates et al. | |
| 7,181,764 B2 | 2/2007 | Zhu et al. | |
| 7,206,814 B2 | 4/2007 | Kirsch | |
| 7,257,564 B2 | 8/2007 | Loughmiller et al. | |
| 7,487,217 B2 | 2/2009 | Buckingham et al. | |
| 7,689,652 B2 | 3/2010 | Mishra et al. | |
| 8,024,777 B2 * | 9/2011 | Shull et al. ...................... 726/3 |
| 8,073,910 B2 * | 12/2011 | Tokuda et al. ............... 709/206 |
| 2005/0080855 A1 | 4/2005 | Murray | |
| 2005/0080856 A1 | 4/2005 | Kirsch | |
| 2005/0091319 A1 | 4/2005 | Kirsch | |
| 2005/0091320 A1 | 4/2005 | Kirsch et al. | |
| 2005/0182735 A1 * | 8/2005 | Zager et al. ..................... 705/67 |
| 2006/0031314 A1 | 2/2006 | Brahms et al. | |
| 2006/0031319 A1 | 2/2006 | Nelson et al. | |
| 2006/0036693 A1 | 2/2006 | Hulten et al. | |
| 2006/0095586 A1 | 5/2006 | Adelman et al. | |
| 2006/0129644 A1 | 6/2006 | Owen et al. | |
| 2006/0168006 A1 | 7/2006 | Shannon et al. | |
| 2007/0061567 A1 * | 3/2007 | Day et al. ...................... 713/159 |
| 2008/0104235 A1 | 5/2008 | Oliver et al. | |
| 2008/0147857 A1 | 6/2008 | Oliver et al. | |
| 2011/0055911 A1 * | 3/2011 | Adelman et al. .................. 726/7 |

OTHER PUBLICATIONS

Scarrow, John., "Preventing spam and phishing using e-mail authentication", Retrieved at << http://windowsteamblog.com/windows_live/b/windowslive/archive/2010/02/04/preventing-spam-and-phishing-using-e-mail-authentication.aspx >>, Feb. 4, 2010, pp. 1-7.

(Continued)

*Primary Examiner* — Kambiz Zand
*Assistant Examiner* — Ghodrat Jamshidi
(74) *Attorney, Agent, or Firm* — Wolfe-SBMC

(57) ABSTRACT

In embodiments of an email trust service, an email message is received at an email distribution service for distribution to a client device that corresponds to a recipient of the email message. Authentication techniques can be applied to verify that the email message is received from an authorized domain as specified in a sender address field of the email message. Additionally, it can be determined whether an Extended Validation certificate is associated with the authorized domain. Responsive to determining that an Extended Validation certificate is associated with the authorized domain, a trust indicator is associated with the email message to generate a trusted email message. The trust indicator indicates that the trusted email message is from an authorized domain when the email message is displayed at the client device.

20 Claims, 7 Drawing Sheets

(56) References Cited

OTHER PUBLICATIONS

Siegler, MG., "Gmail, Now With Favicons", Retrieved at << http://techcrunch.com/2009/10/03/gmail-now-with-favicons/ >>, Oct. 3, 2009, p. 1.
"Final Office Action", U.S. Appl. No. 11/031,672, (Mar. 3, 2009),9 pages.
"Issue Notification", U.S. Appl. No. 11/031,672, (Mar. 10, 2010),1 page.
"Issue Notification", U.S. Appl. No. 11/051,495, (Jan. 14, 2009),1 page.
"Non Final Office Action", U.S. Appl. No. 11/031,672, (Apr. 30, 2008),14 pages.
"Non Final Office Action", U.S. Appl. No. 11/051,495, (Jun. 26, 2008),8 pages.
"Notice of Allowance", U.S. Appl. No. 11/031,672, (Aug. 6, 2009),6 pages.
"Notice of Allowance", U.S. Appl. No. 11/051,495, (Nov. 26, 2008),4 pages.

* cited by examiner

EMAIL TRUST SERVICE

BACKGROUND

Phishing and spoofing attacks attempt to acquire sensitive information from email recipients by sending email messages that appear to be from a trusted source, such as a well-known company or financial institution. Email recipients must be careful, therefore, when responding to or interacting with email messages to ensure that sensitive information, such as bank account numbers, usernames, and passwords, are not communicated to an untrusted source. As a result, some email recipients unknowingly communicate sensitive information to untrusted sources that attempt to solicit personal information, while other email recipients simply ignore email messages received from legitimate sources out of fear that personal information may be obtained and used to their detriment.

SUMMARY

This summary is provided to introduce simplified concepts of an email trust service that is further described below in the Detailed Description. This summary is not intended to identify essential features of the claimed subject matter, nor is it intended for use in determining the scope of the claimed subject matter.

An email trust service is described. In embodiments, an email message is received at an email distribution service for distribution to a client device that corresponds to a recipient of the email message. Authentication techniques can be applied to verify that the email message is received from an authorized domain as specified in a sender address field of the email message. Additionally, it can be determined whether an Extended Validation certificate is associated with the authorized domain. Responsive to determining that an Extended Validation certificate is associated with the authorized domain, a trust indicator is associated with the email message to generate a trusted email message. The trust indicator indicates that the trusted email message is from an authorized domain when the email message is displayed at the client device.

In other embodiments, a trust indicator that is associated with an email message is a Favicon that is associated with the authorized domain. The Favicon can be requested from a website that is associated with the authorized domain and configured to distribute the Favicon, and the Favicon is then received from the website. A displayable version of a trusted email message can be generated for display at a client device along with the Favicon. Alternatively or in addition, a list view of email messages can be generated for display at the client device, where the list view displays with trust indicators as Favicons to indicate the email messages that are received from authorized domains.

BRIEF DESCRIPTION OF THE DRAWINGS

Embodiments of an email trust service are described with reference to the following drawings. The same numbers are used throughout the drawings to reference like features and components.

DETAILED DESCRIPTION

An email trust service is described. In embodiments, email messages are received at an email distribution service for distribution to client devices that correspond to recipients of the email messages. Authentication techniques can be applied to an email message to verify that the email message is received from an authorized domain as specified in a sender address field of the email message. The authentication techniques may include a DomainKeys Identified Mail (DKIM) authentication technique or a SenderID authentication technique. Authenticating an email message using DKIM or SenderID can be utilized to determine whether an email message was received from a sender that is authorized to send the email message from an authorized domain.

Additionally, a determination can be made as to whether an Extended Validation certificate is associated with an authorized domain to determine whether the authorized domain can be trusted. An Extended Validation certificate is a standardized digital certificate that is issued to indicate that an entity or organization responsible for an authorized domain can be trusted. A trust indicator can then be associated with an email message to provide an indication that the email message is trusted when the email message is displayed at a client device. In embodiments, a trust indicator is a Favicon that is associated with the authorized domain, and the Favicon can be associated with the email message and displayed along with the email message at a client device to indicate that the email message is trusted.

While features and concepts of the described systems and methods for an email trust service can be implemented in any number of different environments, systems, devices, and/or various configurations, embodiments of an email trust service are described in the context of the following example devices, systems, and configurations.

Figure 1:
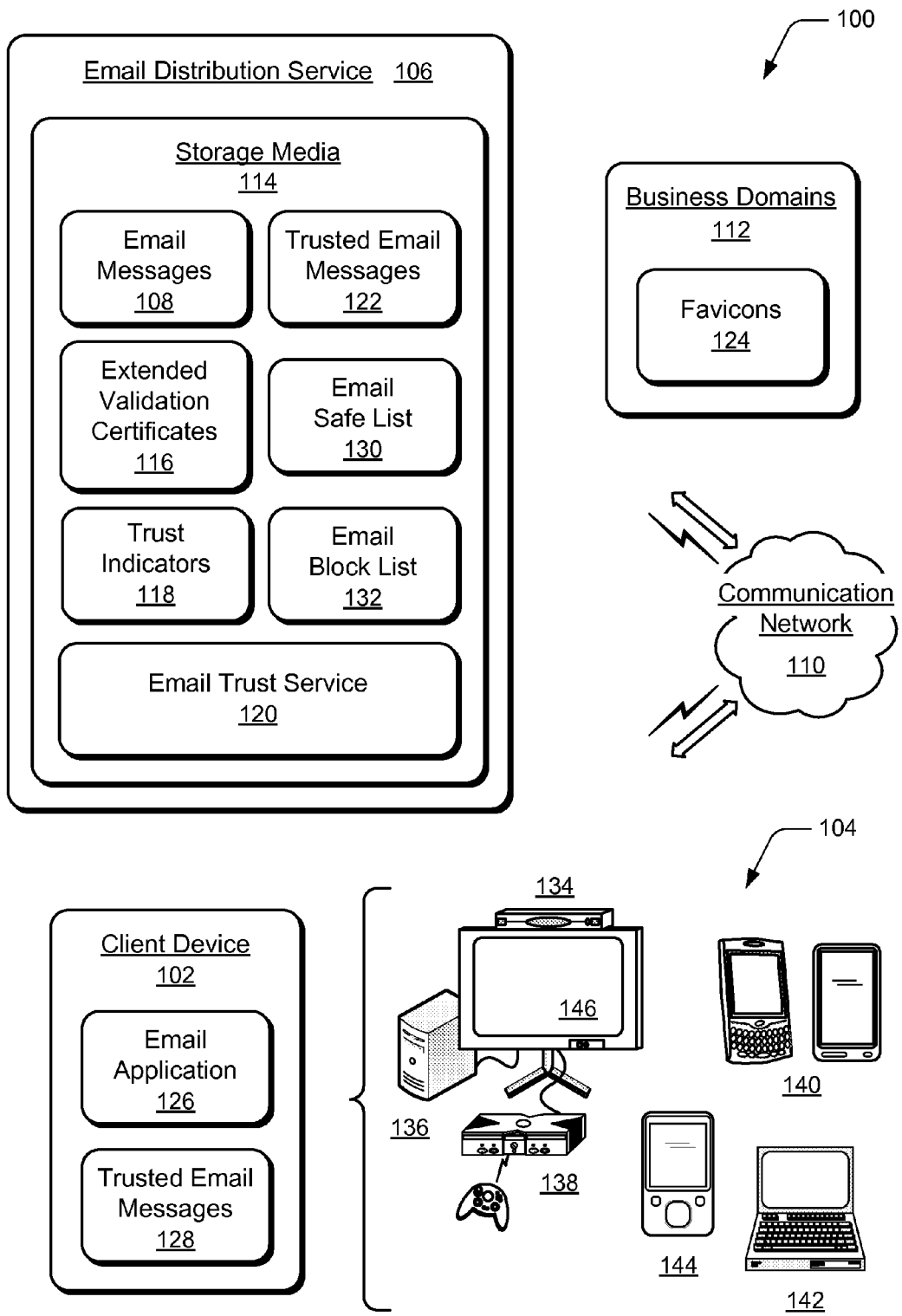
FIG. 1 illustrates an example system in which embodiments of an email trust service can be implemented.

FIG. 1 illustrates an example system 100 in which various embodiments of an email trust service can be implemented. The example system 100 includes a client device 102, which may be configured as any type of client device 104. Some of the various client devices include wired and/or wireless devices, and may also be referred to as user devices and/or portable devices. The example system 100 also includes an email distribution service 106 that receives email messages 108 for distribution to the various client devices that correspond to respective recipients of the email messages. The email distribution service can communicate an email message to a client device 104 via a communication network 110.

Any of the services and devices can communicate via the communication network 110, which can be implemented to include a wired and/or a wireless network that facilitates email message distribution and data communication. The communication network can also be implemented using any type of network topology and/or communication protocol, and can be represented or otherwise implemented as a combination of two or more networks. The communication network may also include mobile operator networks that are managed by mobile operators, such as a communication service provider, cell-phone provider, and/or Internet service provider. A mobile operator can facilitate mobile data and/or voice communication for any type of a wireless device or mobile phone (e.g., cellular, VoIP, Wi-Fi, etc.).

The email distribution service 106 can include server devices to receive email messages, such as from various business domains 112 and communicate, or otherwise distribute, the received email messages to any number of the various client devices. In this example system 100, the email distribution service includes storage media 114 to store or otherwise maintain various data, such as the email messages, Extended Validation certificates 116, and trust indicators 118. The storage media can be implemented as any type of memory and/or suitable electronic data storage. Additionally, the email distribution service may be implemented as a subscription-based service from which any of the various client devices 104 can request email messages. The email distribution service manages email message distribution to the various client devices, such as when a request for an email message is received from a client device, and the email distribution service communicates or provides data segments of the email message to the client device.

In this example system 100, the email distribution service 106 includes an email trust service 120 that can be implemented as computer-executable instructions, such as a software application, and executed by one or more processors to implement the various embodiments described herein. The email distribution service can also be implemented with any number and combination of differing components as further described with reference to the example device shown in FIG. 7. Additionally, the email trust service may be implemented as an independent service separate from the email distribution service (e.g., on a separate server, by a third party service, or on a client device).

In various embodiments, the email trust service 120 is implemented to determine whether an email message 108 can be trusted, such as whether an email message originated from a trusted business domain 112. The email trust service is then implemented to associate a trust indicator with the email message to generate a trusted email message 122.

To determine whether an email message 108 is trusted, the email trust service 120 is implemented to apply authentication techniques to verify that the email message is received from an authorized domain as specified in a sender address field of the email message. For example, the email trust service verifies that an email message is received from a reputable source, such as a well-known company, financial institution, or other legitimate business at a known business domain 112. The sender address field (also referred to as a "From" address) of an email message indicates the address from which an email message is received and can be divided into two parts: a username of the sender of the email message and a domain name from which the email message originated. The sender address for an email message may be "john@starbank.com". The username of the sender is "john" and the domain name is "starbank.com". In this example, the email trust service is implemented to verify that the email message was actually received from the domain name "starbank.com".

Various authentication techniques can be applied by the email trust service 120 to an email message 108. In an embodiment, the email trust service applies DomainKeys Identified Mail (DKIM) authentication techniques and/or SenderID authentication techniques to an email message. Both DKIM and SenderID can be used to verify that an email message is received from an authorized domain as specified in the sender address field of the email message.

After verifying that an email message 108 is received from an authorized domain, the email trust service 120 can determine whether an Extended Validation certificate 116 is associated with the authorized domain from which the email is received. In an embodiment, the email trust service can extract the domain name from the sender address field of the email message and establish a secure connection with the domain, such as by connecting to a website associated with the domain. For example, the email trust service can extract the domain "starbank.com" from the sender address "john@starbank.com", and then establish a secure connection with the website "www.starbank.com", which may be a business domain 112.

When the secure connection is established, a certificate is received from the business domain 112 as part of the secure connection. The email trust service 120 can then examine the certificate provided by the domain to determine whether the certificate is an Extended Validation certificate. If the certificate is an Extended Validation certificate, the email trust service determines that the email is received from a trusted domain that has already been verified by an Extended Validation certificate Authority.

The email trust service 120 is implemented to then associate a trust indicator 118 with the email message 108 to generate a trusted email message 122. A trust indicator can be any type of image, graphic, text, or sound indication that an email message is trusted. In embodiments, a trust indicator 118 is a Favicon, such as a Favicon 124 that is associated with a business domain 112 that has been verified as trusted. The email trust service can obtain a Favicon that is associated with an authorized business domain. A Favicon that is associated with a business domain generally includes a logo or picture that is associated with the particular domain, such as a logo of a business or organization.

In embodiments, the email trust service 120 is implemented to cache an Extended Validation certificate 116 and/or a Favicon 124 with the storage media 114. When subsequent email messages are then received from the same business domain 112, the email trust service can verify that an Extended Validation certificate is associated with the business domain with the cached Extended Validation certificates. Similarly, when a subsequent email message is determined to be trusted, the email trust service can associate a cached Favicon with the trusted email message.

The example client device 102 includes an email application 126 that can request, receive, and process email messages for a user at the client device. The client device can receive a trusted email message 128 from the email distribution service 106, such as when a user at the client device initiates the email application. The client device 102 can then display the trusted email message along with a trust indicator or Favicon that indicates to a recipient of the email message that the email message is trusted.

The email distribution service 106 can receive a request for the email messages 108 from the client device 102, and then generate a displayable version of a trusted email message 122 that is communicated to the client device for display as a trusted email message 128. The trusted email message can be displayed along with the associated trust indicator, such as a Favicon, to indicate to a recipient of the email message that the email message is trusted. Examples of displaying a trust indicator, such as a Favicon, along with an email message at a client device are illustrated and described with reference to FIGS. 2 and 3 below.

In an embodiment, the email trust service 120 at the email distribution service 106 can receive a request, such as from the client device 102, to add an authorized domain to an email safe list 130. For example, after communicating a trusted email message 122 to the client device, a recipient of the trusted email message can request that the domain name specified in the sender address field of the email message be added to the email safe list. The email trust service can then determine whether a domain name that is specified in the sender address field of a subsequently received email message is maintained in the email safe list when determining whether the email message is trusted. For example, if an email message is received from a domain that is listed in the email safe list, the email trust service may determine that the email is trusted without applying authentication techniques and/or without determining whether an Extended Validation certificate is associated with the domain. The email distribution service 106 can also maintain an email block list 132 of domain names that are not trusted by a user, or that have been determined as untrusted.

Any of the various client devices 104 can be configured as the client device 102, and may be implemented with any number and combination of differing components as further described with reference to the example device shown in FIG. 7. In this example system 100, a client device 104 can be implemented as any one or combination of a television client device 134, a computer device 136, a gaming system 138, an appliance device, an electronic device, and/or as any other type of device that may be implemented to receive content (e.g., email messages) in any form of audio, video, and/or image data. The various client devices can also include wireless devices implemented to receive and/or communicate wireless data, such as any one or combination of a mobile phone 140 (e.g., cellular, VoIP, WiFi, etc.), a portable computer device 142, a media player device 144, and/or any other wireless device that can receive media content (e.g., email messages) in any form of audio, video, and/or image data. A client system can include a respective client device and display device 146 that together render email messages for display. The display device can be implemented as any type of a television, high definition television (HDTV), LCD, or similar display system.

Figure 2:
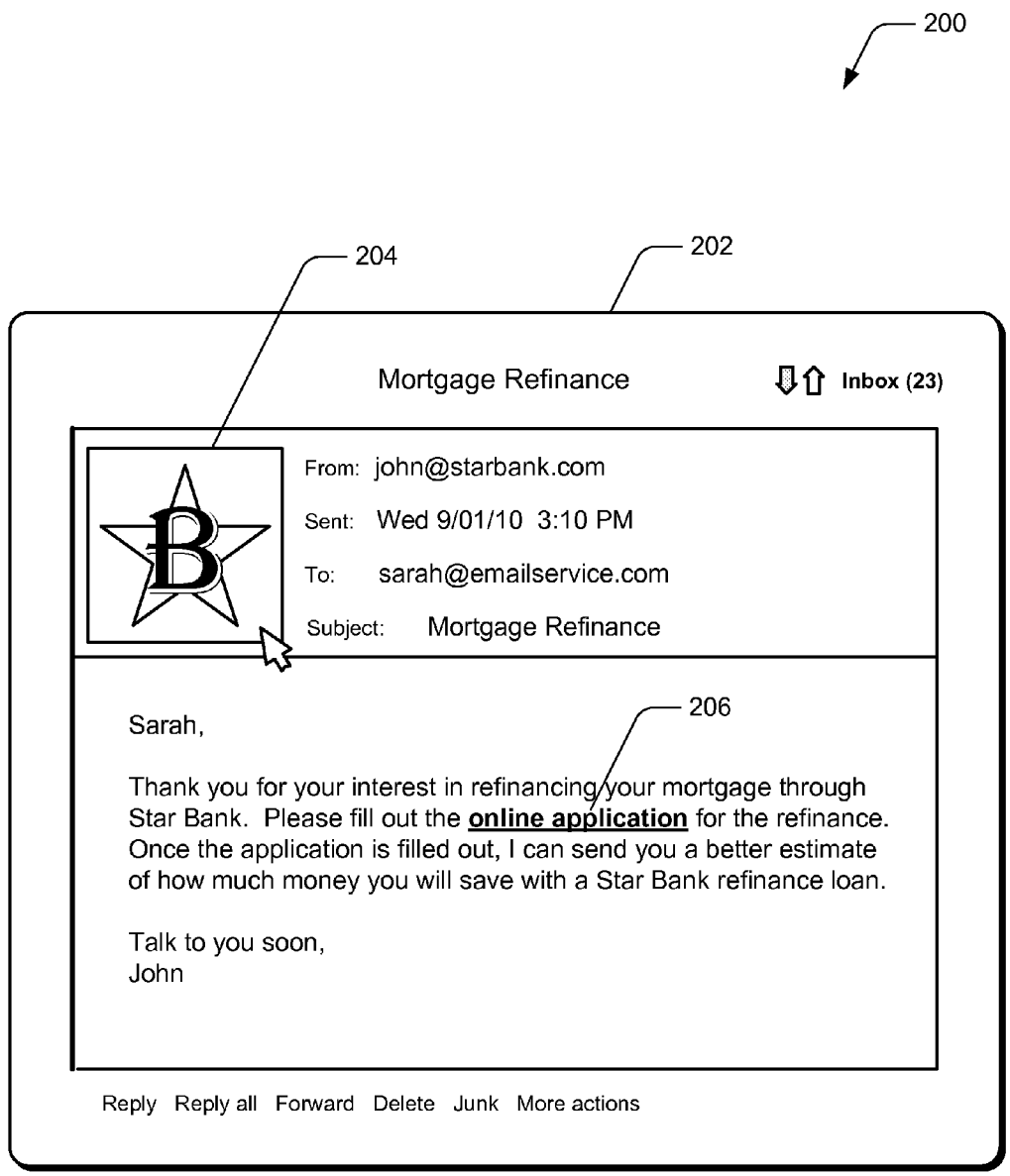
FIG. 2 illustrates an example of a trusted email message displayed at a client device in accordance with one or more embodiments.

FIG. 2 illustrates an example 200 of a trusted email message 202 displayed at a client device in accordance with the various embodiments described herein. The trusted email message is an example of a trusted email message 128 received at client device 102 as described with reference to FIG. 1. The trusted email message includes a trust indicator 204 that provides an indication the email message is trusted. The trust indicator can be displayed as any type of text, image, animation, color, sound, or other indication to an email recipient that the email is trusted.

In this example, the trust indicator 204 is a Favicon of the domain "starbank.com". The display of the Favicon indicates to the email recipient that the email message from the domain "starbank.com" is trusted, and the email recipient can confidently reply to the email message and/or interact with the email message, such as by selecting a hyperlink 206 that is included within the email message. In an embodiment, the trust indicator 204 is also a user-selectable control that a user can select to initiate an interaction, such as to display a website associated with the business domain.

Figure 3:
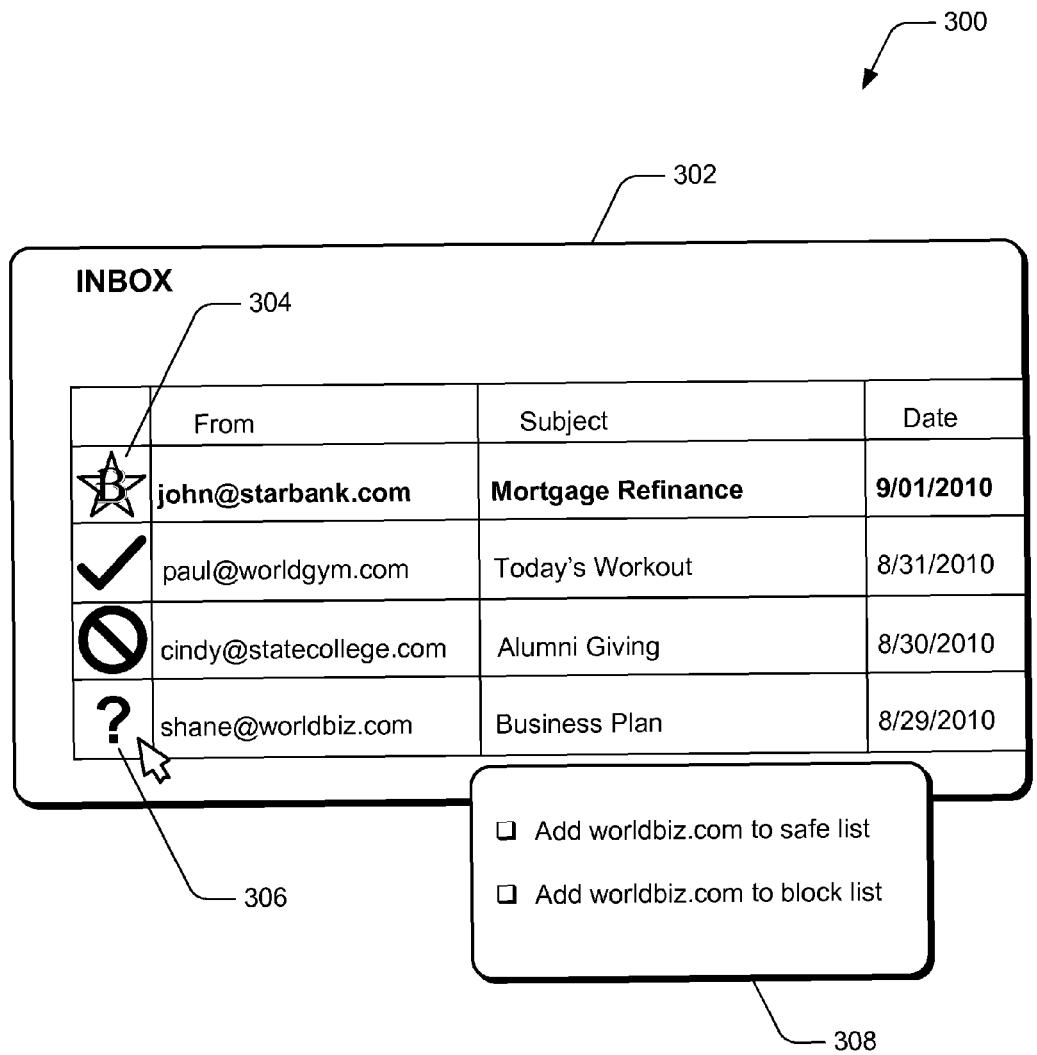
FIG. 3 illustrates an example of a display list of email messages displayed at a client device in accordance with one or more embodiments.

FIG. 3 illustrates an example 300 of a list view 302 of email messages displayed at a client device in accordance with various embodiments described herein. In this example, a trust indicator is displayed proximate each email message in the list view to indicate trusted email messages that are received from authorized domains. For example, the email message from "john@starbank.com" is displayed in the list view and the Star Bank Favicon 304 is displayed proximate the email message to indicate that the email message is trusted.

The list view 302 of the email messages also includes an email message from "paul@worldgym.com" that includes a trust indicator displayed proximate the email message as a check mark. In this example, the domain "worldgym.com" may not have an associated Favicon, and a generic trust indicator is provided by the email trust service and displayed to indicate that the domain "worldgym.com" is trusted. Note that other types of generic trust indicators may be used instead of the check mark depicted in this example.

The list view 302 of the email messages also includes an email message from "cindy@statecollege.com" that includes a non-trust indicator displayed proximate the email message as a circle with a line through it. In this example, the domain "statecollege.com" has been determined not to be a trusted domain by the email trust service, and the non-trust indicator indicates that the domain should not be trusted by the recipient of the email message. Note that other types of non-trust indicators may be used instead of the non-trust indicator depicted in this example.

The list view 302 of the email messages also includes an email message from "shane@worldbiz.com" that includes a trust indicator 306 displayed proximate the email message as a question mark. In this case, the question mark trust indicator indicates that the email trust service has not determined whether or not the domain "worldbiz.com" is trusted. For example, the domain may be an authorized domain, but not have an associated Extended Validation certificate. Therefore, the question mark trust indicator is displayed to indicate that the email message may or may not be trusted. In an embodiment, the trust indicator 306 is also a user-selectable control that a user can select to initiate an interaction, such as to display a user interface 308.

The user interface enables the email recipient to request that the domain name specified in the sender address field of the email message be added to an email safe list of domain names that are trusted by the user, or added to an email block list of domain names that are not trusted by the user. In this example, the email recipient can request to add "worldbiz.com" to the email safe list or to the email block list. For example, if the email recipient frequently conducts business with "worldbiz.com", the email recipient may request to add the domain to the email safe list. Alternatively, if the email recipient frequently receives junk mail from "worldbiz.com", the email recipient may request to add the domain to the email block list. As described above, the request is communicated to the email trust service at the email distribution service, and the email trust service adds the domain name to the email safe list or to the email block list in accordance with the request.

Figure 4:
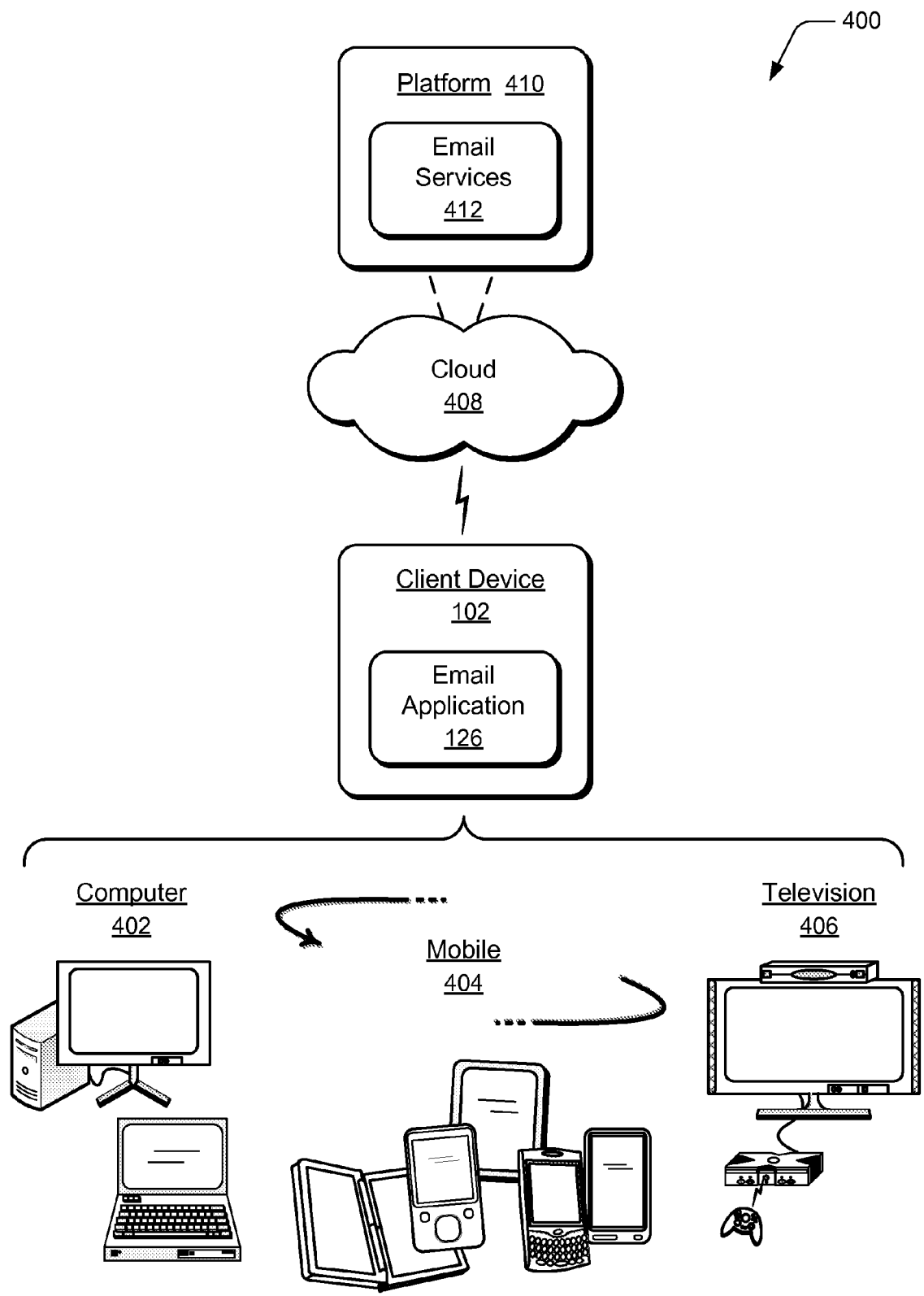
FIG. 4 illustrates an example system with multiple devices for a seamless user experience in ubiquitous environments.

FIG. 4 illustrates an example system 400 that includes the client device 102 as described with reference to FIG. 1. The example system 400 enables ubiquitous environments for a seamless user experience when running applications on any type of computer, television, and/or mobile device. Services and applications run substantially similar in all environments for a common user experience when transitioning from one device to the next while utilizing an application, playing a video game, watching a video, listening to music, and so on.

In the example system 400, multiple devices can be interconnected through a central computing device, which may be local to the multiple devices or may be located remotely from the multiple devices. In one embodiment, the central computing device may be a cloud of one or more server computers that are connected to the multiple devices through a network, the Internet, or other data communication link. In embodiments, this interconnection architecture enables functionality across multiple devices to provide a common and seamless experience to a user of the multiple devices. Each of the devices may have different physical requirements and capabilities, and the central computing device uses a platform to enable delivery of an experience that is both tailored to a particular device and yet common to all of the devices. In one embodiment, a class of target devices is created and user experiences are tailored to the generic class of devices. A class of devices may be defined by physical features, types of usage, or other common characteristics of the devices.

In various implementations, the client device 102 may be implemented in a variety of different configurations, such as for computer 402, mobile 404, and television 406 uses. Each of these configurations includes devices that may have generally different constructs and capabilities, and the client device may be configured according to one or more of the different device classes. For example, the client device may be implemented as any type of a personal computer, desktop computer, a multi-screen computer, laptop computer, tablet, netbook, and so on.

The client device 102 may also be implemented as any type of mobile device, such as a mobile phone, portable music player, portable gaming device, a tablet computer, a multi-screen computer, and so on. The client device may also be implemented as any type of television device having or connected to generally larger screens in casual viewing environments. These devices include televisions, set-top boxes, gaming consoles, and so on. The techniques described herein may be supported by these various configurations of the client device and are not limited to the specific examples of an email trust service described herein.

The cloud 408 includes and/or is representative of a platform 410 for email services 412. The platform abstracts underlying functionality of hardware, such as server devices, and/or software resources of the cloud. The email services may include applications and/or data that can be utilized while computer processing is executed on servers that are remote from the client device. For example, the email services may include the email distribution service 106 and/or the email trust service 120 as described with reference to FIG. 1. The email services 412 can be provided as a service over the Internet and/or through a subscriber network, such as a cellular or WiFi network.

The platform 410 may abstract resources and functions to connect the client device 102 with other computing devices. The platform may also serve to abstract scaling of resources to provide a corresponding level of scale to encountered demand for the services that are implemented via the platform. Accordingly, in an interconnected device embodiment, implementation of functionality of the email application 126 may be distributed throughout the system 400. For example, the email application 126 may be implemented in part on the client device as well as via the platform that abstracts the functionality of the cloud.

Example methods 500 and 600 are described with reference to respective FIGS. 5 and 6 in accordance with one or more embodiments of an email trust service. Generally, any of the functions, methods, procedures, components, and modules described herein can be implemented using software, firmware, hardware (e.g., fixed logic circuitry), manual processing, or any combination thereof. A software implementation represents program code that performs specified tasks when executed by a computer processor. The example methods may be described in the general context of computer-executable instructions, which can include software, applications, routines, programs, objects, components, data structures, procedures, modules, functions, and the like. The program code can be stored in one or more computer-readable memory devices, both local and/or remote to a computer processor. The methods may also be practiced in a distributed computing environment by multiple computer devices. Further, the features described herein are platform-independent and can be implemented on a variety of computing platforms having a variety of processors.

Figure 5:
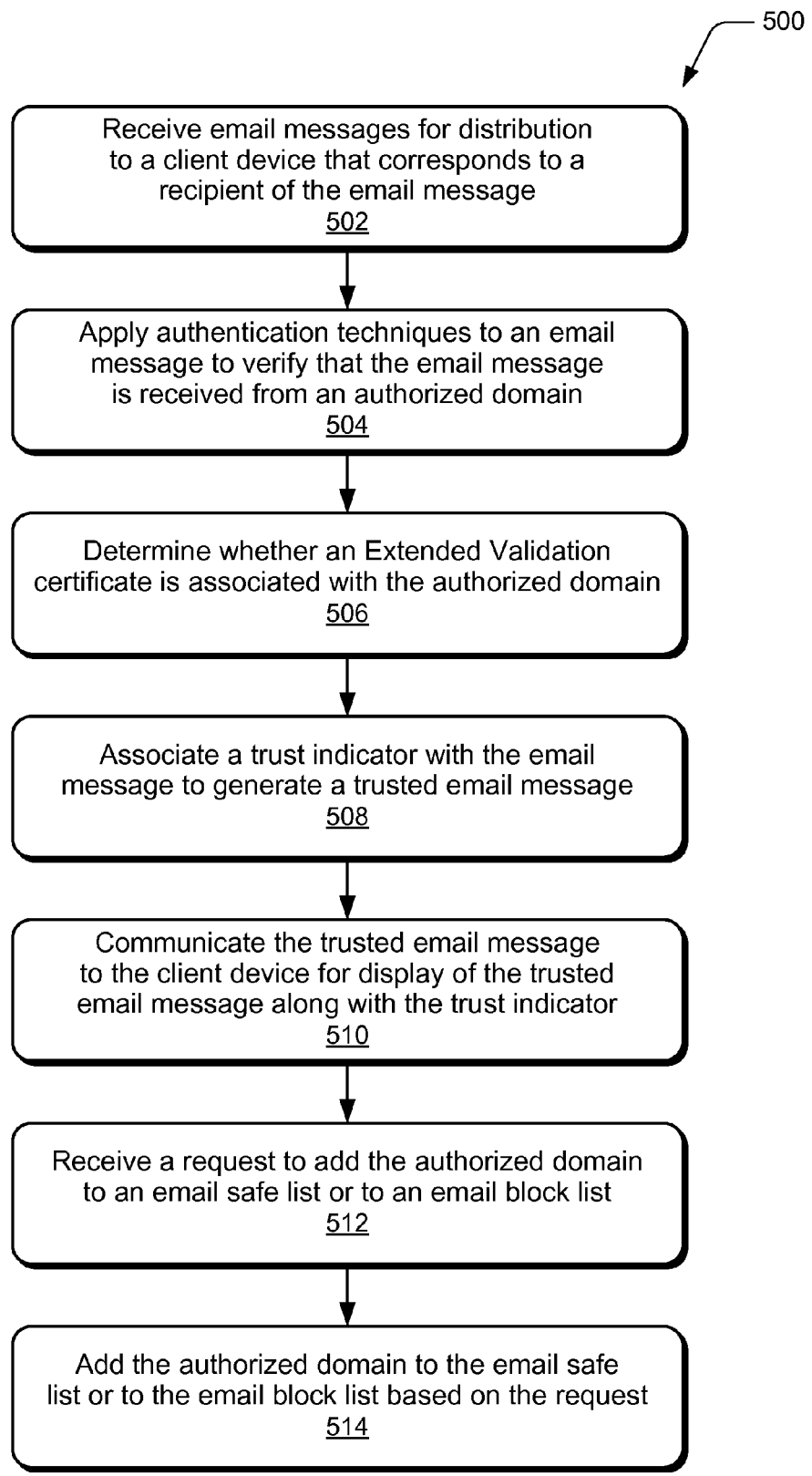
FIG. 5 illustrates example method(s) of an email trust service in accordance with one or more embodiments.

FIG. 5 illustrates example method(s) 500 of an email trust service, and is described with reference to an email distribution service. The order in which the method blocks are described are not intended to be construed as a limitation, and any number of the described method blocks can be combined in any order to implement a method, or an alternate method.

At block 502, email messages are received for distribution to a client device that corresponds to a recipient of the email message. For example, the email distribution service 106 (FIG. 1) receives email messages 108 for distribution to the various client devices 104 that correspond to respective recipients of the email messages.

At block 504, authentication techniques are applied to an email message to verify that the email message is received from an authorized domain. For example, the email trust service 120 applies authentication techniques to an email message 108 to verify that the email message is received from an authorized domain as specified in a sender address field of the email message. The authentication techniques may include a DomainKeys Identified Mail (DKIM) authentication technique and/or a SenderID authentication technique. If the authentication techniques indicate that the email message is not received from an authorized domain, the email trust service can block the email message from being communicated to a client device. Alternatively, the email trust service can associate a non-trust indicator with the email message that is then be displayed with the email message at a client device to indicate to the email recipient that the email message is not trusted.

At block 506, it is determined whether an Extended Validation certificate is associated with the authorized domain. For example, the email trust service 120 determines whether an Extended Validation certificate 116 is associated with the authorized domain. In embodiments, the email trust service determines whether an Extended Validation certificate is associated with the authorized domain by extracting a domain name from a sender address field of the email message and then examining a certificate provided by a website that is associated with the domain name. If the email trust service determines that the certificate is not an Extended Validation certificate, the email trust service can block the email message from being communicated to a client device. Alternatively, the email trust service can associate a non-trust indicator with the email message that is then displayed with the email message at a client device to indicate to the email recipient that the email message is not trusted.

At block 508, a trust indicator is associated with the email message to generate a trusted email message. For example, the email trust service 120 associates a trust indicator 118 with an email message 108 to generate a trusted email message 122, such as when determining that the Extended Validation certificate is associated with the authorized domain. In embodiments, a trust indicator is a Favicon that is associated with a domain name specified in a sender address field of the trusted email message. For example, the email trust service requests a Favicon from a website that is associated with the authorized domain and configured to distribute the Favicon, and then receives the Favicon from the website. Additionally, the email trust service can cache Extended Validation certificates and Favicons for use to authenticate additional email messages.

At block 510, the trusted email message is communicated to the client device for display of the trusted email message along with the trust indicator. For example, the email distribution service 106 communicates the trusted email message to the client device 102 that corresponds to the recipient of the email message for display of the trusted email message along with the trust indicator. The email distribution service generates a displayable version of the trusted email message for display at the client device, and the trust indicator is displayed proximate the trusted email message to indicate to the email recipient that the email message is trusted. The email distribution service also generates a list view of email messages for display at the client device, where the list view displays with trust indicators as Favicons proximate trusted ones of the email messages that are received from authorized domains.

At block 512, a request is received to add the authorized domain to an email safe list or to an email block list and, at block 514, the authorized domain is added to the email safe list or to the email block list based on the request. For example, the email trust service 120 at the email distribution service 106 receives a user request from the client device 102 to add the authorized domain that is specified in the sender address field of the email message to the email safe list 130 or to the email block list 132. The email trust service then adds the domain to the email safe list or to the email block list.

Figure 6:
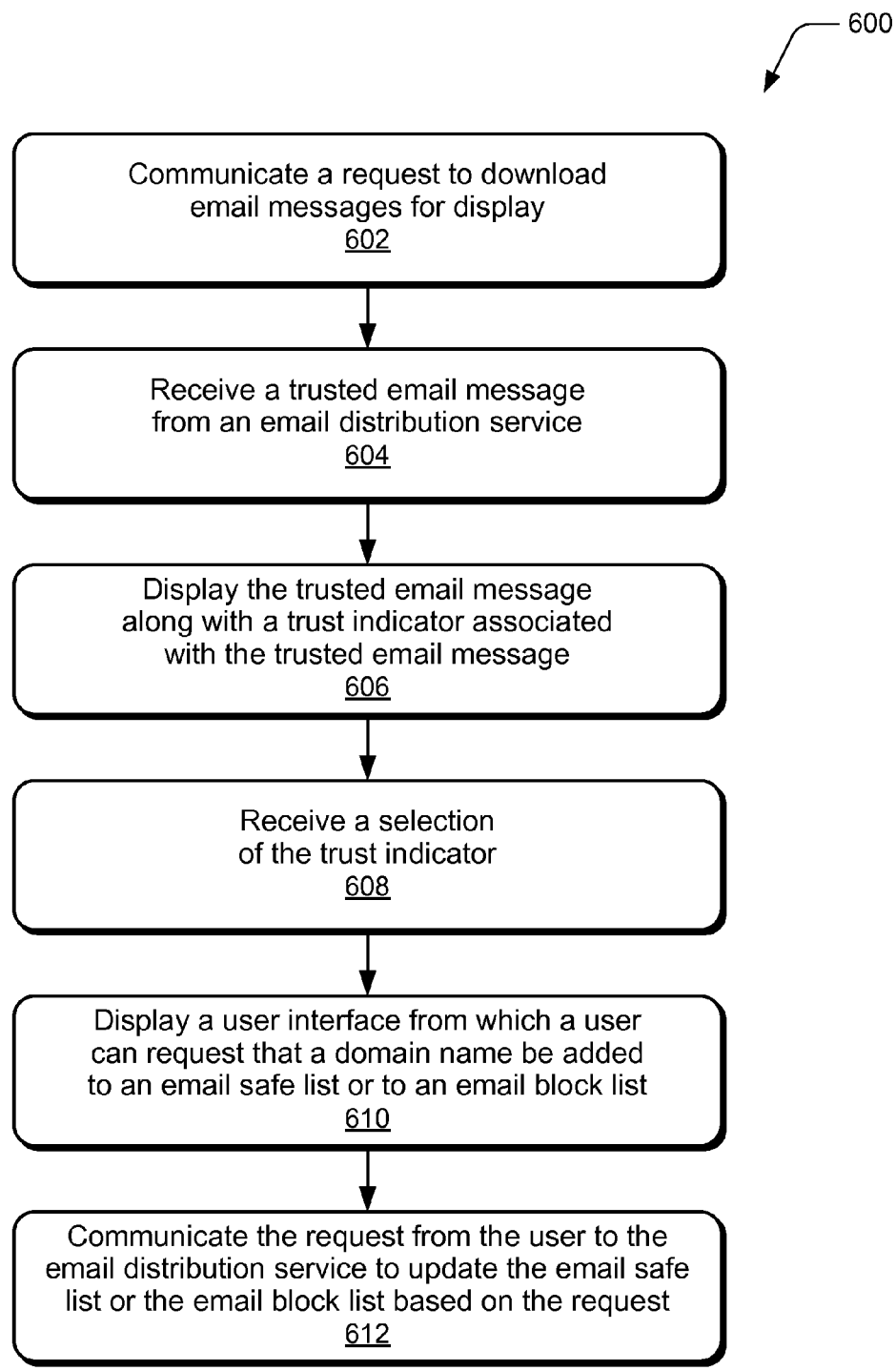
FIG. 6 illustrates additional example method(s) of an email trust service in accordance with one or more embodiments.

FIG. 6 illustrates example method(s) 600 of an email trust service, and is described with reference to a client device. The order in which the method blocks are described are not intended to be construed as a limitation, and any number of the described method blocks can be combined in any order to implement a method, or an alternate method.

At block 602, a request is communicated to an email distribution service to download email messages for display. For example, the client device 102 (FIG. 1) communicates a request to the email distribution service 106 for email messages that have been sent to a user of the client device. At block 604, a trusted email message is received from an email distribution service. For example, the client device 102 receives a trusted email message 128 from the email distribution service 106, such as when a user at the client device initiates the email application 126 to request, receive, and process email messages.

At block 606, the trusted email message is displayed along with a trust indicator associated with the trusted email message. For example, the client device 102 displays the trusted email message 128 (e.g., on a display device 146 or on an integrated display) along with a trust indicator that is associated with the trusted email message. In embodiments, the trust indicator is displayed as a Favicon that is associated with a domain name specified in a sender address field of the trusted email message. For example, the trust indicator 204 (FIG. 2) is displayed proximate the trusted email message 202 to indicate that the email message is trusted. Similarly, the trust indicator 304 (FIG. 3) is displayed as a Favicon proximate an email message in the list view 302 of email messages to indicate that an email message is trusted.

At block 608, a selection of the trust indicator is received and, at block 610, a user interface is displayed from which a user can request that a domain name be added to an email safe list or to an email block list. For example, the client device 102 receives a user selection of the trust indicator 306 to initiate a display of the user interface 308 that enables the user to request that the domain be added to the email safe list 130 or to the email block list 132. At block 612, the user request is communicated to the email distribution service to update the email safe list or the email block list based on the request. For example, the client device 102 communicates the request from the user to the email distribution service 106 where the email trust service 120 updates the email safe list 130 or the email block list 132 based on the request.

Figure 7:
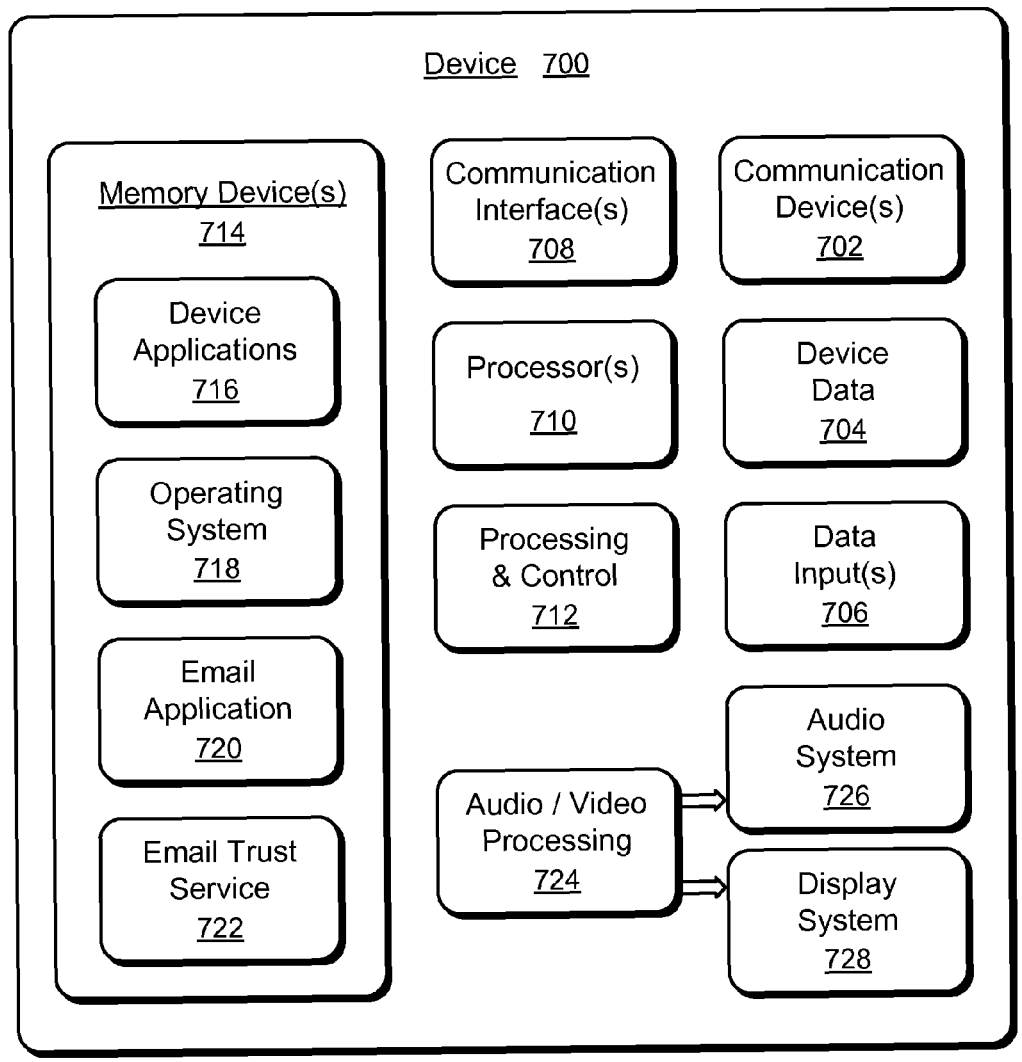
FIG. 7 illustrates various components of an example device that can implement embodiments of an email trust service.

FIG. 7 illustrates various components of an example device 700 that can be implemented as any of the devices, or services implemented by devices, described with reference to the previous FIGS. 1-6. In embodiments, the device may be implemented as any one or combination of a fixed or mobile device, in any form of a consumer, computer, server, portable, user, communication, phone, navigation, television, appliance, gaming, media playback, and/or electronic device. The device may also be associated with a user (i.e., a person) and/or an entity that operates the device such that a device describes logical devices that include users, software, firmware, hardware, and/or a combination of devices.

The device 700 includes communication devices 702 that enable wired and/or wireless communication of device data 704, such as received data, data that is being received, data scheduled for broadcast, data packets of the data, etc. The device data or other device content can include configuration settings of the device, media content stored on the device, and/or information associated with a user of the device. Media content stored on the device can include any type of audio, video, and/or image data. The device includes one or more data inputs 706 via which any type of data, media content, and/or inputs can be received, such as user-selectable inputs, messages, communications, music, television content, recorded video content, and any other type of audio, video, and/or image data received from any content and/or data source.

The device 700 also includes communication interfaces 708, such as any one or more of a serial, parallel, network, or wireless interface. The communication interfaces provide a connection and/or communication links between the device and a communication network by which other electronic, computing, and communication devices communicate data with the device.

The device 700 includes one or more processors 710 (e.g., any of microprocessors, controllers, and the like) which process various computer-executable instructions to control the operation of the device. Alternatively or in addition, the device can be implemented with any one or combination of software, hardware, firmware, or fixed logic circuitry that is implemented in connection with processing and control circuits which are generally identified at 712. Although not shown, the device can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

The device 700 also includes one or more memory devices (e.g., computer-readable storage media) 714 that enable data storage, such as random access memory (RAM), non-volatile memory (e.g., read-only memory (ROM), flash memory, etc.), and a disk storage device. A disk storage device may be implemented as any type of magnetic or optical storage device, such as a hard disk drive, a recordable and/or rewriteable disc, and the like. The device may also include a mass storage media device.

Computer readable media can be any available medium or media that is accessed by a computing device. By way of example, and not limitation, computer readable media may comprise storage media and communication media. Storage media include volatile and non-volatile, removable and non-removable media implemented in any method or technology for storage of information, such as computer-readable instructions, data structures, program modules, or other data. Storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by a computer.

Communication media typically embody computer-readable instructions, data structures, program modules, or other data in a modulated data signal, such as carrier wave or other transport mechanism. Communication media also include any information delivery media. The term modulated data signal means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

A memory device 714 provides data storage mechanisms to store the device data 704, other types of information and/or data, and various device applications 716. For example, an operating system 718 can be maintained as a software application with a memory device and executed on the processors. The device applications may also include a device manager, such as any form of a control application, software application, signal processing and control module, code that is native to a particular device, a hardware abstraction layer for a particular device, and so on.

In this example, the device applications 716 include an email application 720, such as when device 700 is implemented as a client device. Alternatively or in addition, the device applications include an email trust service 722, such as when the device is implemented as an email distribution service. The email application and the email trust service are shown as software modules and/or computer applications. Alternatively or in addition, the email application and/or the email trust service can be implemented as hardware, software, firmware, fixed logic, or any combination thereof The device 700 also includes an audio and/or video processing system 724 that generates audio data for an audio system 726 and/or generates display data for a display system 728. The audio system and/or the display system may include any devices that process, display, and/or otherwise render audio, video, display, and/or image data. Display data and audio signals can be communicated to an audio device and/or to a display device via an RF (radio frequency) link, S-video link, composite video link, component video link, DVI (digital video interface), analog audio connection, or other similar communication link. In implementations, the audio system and/or the display system are external components to the device. Alternatively, the audio system and/or the display system are integrated components of the example device.

Although embodiments of the email trust service have been described in language specific to features and/or methods, the subject of the appended claims is not necessarily limited to the specific features or methods described. Rather, the specific features and methods are disclosed as example implementations of the email trust service.

The invention claimed is:

1. A computer-implemented method, comprising:
    receiving an email message for distribution to a client device that corresponds to a recipient of the email message;
    applying one or more authentication techniques to the email message to verify that the email message is received from an authorized domain as specified in a sender address field of the email message;
    determining whether an Extended Validation certificate is associated with the authorized domain when authenticating the email message;
    associating a trust indicator with the email message to generate a trusted email message responsive to determining that the Extended Validation certificate is associated with the authorized domain; and
    communicating the trusted email message to the client device that corresponds to the recipient of the email message for display of the trusted email message along with the trust indicator, the trust indicator being user-selectable to initiate an interaction comprising displaying a website associated with the authorized domain at the client device.

2. A computer-implemented method as recited in claim 1, wherein determining whether the Extended Validation certificate is associated with the authorized domain comprises:
    extracting a domain name from the email message;
    establishing a secure connection with the authorized domain that corresponds to the domain name;
    receiving a certificate from the authorized domain via the secure connection;
    examining the certificate provided by the authorized domain to determine whether the certificate is the Extended Validation certificate; and
    determining that the authorized domain is trusted based on an Extended Validation certificate authority.

3. A computer-implemented method as recited in claim 1, further comprising generating a displayable version of the trusted email message for display at the client device, the displayable version of the trusted email message generated to display with the trust indicator proximate the trusted email message.

4. A computer-implemented method as recited in claim 1, further comprising
    communicating additional trusted email messages from other authorized domains to the client device for display of the additional trusted email messages along with the trust indicator.

5. A computer-implemented method as recited in claim 1, further comprising generating a list view of email messages for display at the client device, the list view generated to display with trust indicators as Favicons proximate the trusted ones of the email messages that are received from authorized domains.

6. A computer-implemented method as recited in claim 1, wherein the trust indicator comprises:
    a Favicon that is associated with the authorized domain; and
    a user-selectable control to initiate the interaction.

7. A computer-implemented method as recited in claim 6, further comprising:
    requesting the Favicon from a website that is associated with the authorized domain and configured to distribute the Favicon; and
    receiving the Favicon from the website.

8. A computer-implemented method as recited in claim 6, further comprising:

temporarily caching the Extended Validation certificate and the Favicon to authenticate additional email messages; and periodically updating the Extended Validation certificate and the Favicon.

9. A computer-implemented method as recited in claim 1, further comprising associating a non-trust indicator with the email message responsive to determining at least one of the email message is received from an unauthorized domain, or the Extended Validation certificate is not associated with the authorized domain.

10. A computer-implemented method as recited in claim 1, wherein the one or more authentication techniques, comprise at least one of a DomainKeys Identified Mail (DKIM) authentication technique or a SenderID authentication technique.

11. A computer-implemented method as recited in claim 1, further comprising:

receiving a request to add the authorized domain specified in the sender address field of the email message to an email safe list created by the recipient of the email message; and adding the authorized domain to the email safe list based on the request.

12. A system, comprising:

an email distribution service configured to receive email messages for distribution to client devices that correspond to respective recipients of the email messages; and at least a memory and a processor to implement an email trust service configured to:

apply one or more authentication techniques to an email message to verify that the email message is received from an authorized domain specified in a sender address field of the email message;

determine whether an Extended Validation certificate is associated with the authorized domain when the email message is authenticated;

obtain a Favicon associated with the authorized domain responsive to a determination that the Extended Validation certificate is associated with the authorized domain;

associate the Favicon with the email message from the authorized domain; and communicate the email message to a client device that corresponds to the recipient of the email message for display of the email message along with a trust indicator that is user-selectable to initiate a user interaction comprising displaying a website associated with the authorized domain at the client device.

13. A system as recited in claim 12, wherein to said determine whether an Extended Validation certificate is associated with the authorized domain, the email trust service is configured to:

extract a domain name from the email message;
establish a secure connection with a website associated with the domain name;
receive a certificate from the website via the secure connection;
examine the certificate provided by the website associated with the domain name to determine whether the certificate is the Extended Validation certificate; and
determine that the authorized domain is trusted based on an Extended Validation certificate authority.

14. A system as recited in claim 12, wherein the email trust service is further configured to:

request the Favicon from a website that is associated with the authorized domain and configured to distribute the Favicon; and receive the Favicon from the website.

15. A system as recited in claim 12, wherein the email trust service is further configured to associate a non-trust indicator with the email message responsive to determining at least one of the email message is received from an unauthorized domain, or the Extended Validation certificate is not associated with the authorized domain.

16. A system as recited in claim 12, wherein the email distribution service is further configured to generate a displayable version of the email message for display at a client device, the displayable version of the email message generated to display with the Favicon proximate the email message.

17. A system as recited in claim 12, wherein the one or more authentication techniques comprise at least one of a DomainKeys Identified Mail (DKIM) authentication technique or a SenderID authentication technique.

18. A system as recited in claim 12, wherein the email trust service is further configured to:

receive a request to add the authorized domain specified in the sender address field of the email message to an email safe list created by a recipient of the email message; and add the authorized domain to the email safe list based on the request.

19. A computer-implemented method, comprising:

communicating a request to download email messages for display;

receiving a trusted email message from an email distribution service, the trusted email message including a Favicon associated with an authorized domain as specified in a sender address field of the trusted email message, the email distribution service having performed:

extracting a domain name from the email message;
establishing a secure connection with the authorized domain that corresponds to the domain name;
receiving a certificate from the authorized domain via the secure connection;
examining the certificate provided by the authorized domain to determine whether the certificate is the Extended Validation certificate;
determining that the authorized domain is trusted based on an Extended Validation certificate authority;

displaying the trusted email message with the Favicon displayed proximate the trusted email message responsive to the email distribution service said determining that the authorized domain is trusted; and receiving a selection of the Favicon that initiates displaying a website associated with the authorized domain.

20. The computer-implemented method as recited in claim 19, wherein the Favicon indicates that the Extended Validation certificate is associated with the authorized domain.

* * * * *